United States Patent
Yang et al.

(10) Patent No.: US 7,663,536 B2
(45) Date of Patent: *Feb. 16, 2010

(54) APPARATUS AND METHOD FOR ESTIMATING DISTANCE USING TIME OF ARRIVAL

(75) Inventors: Wan Cheol Yang, Gyunggi-Do (KR);
Chang Soo Yang, Gyunggi-Do (KR);
Sang Yub Lee, Gyunggi-Do (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/850,636

(22) Filed: Sep. 5, 2007

(65) Prior Publication Data
US 2008/0068255 A1    Mar. 20, 2008

(30) Foreign Application Priority Data
Sep. 18, 2006    (KR) ...................... 10-2006-0090309

(51) Int. Cl.
*G01S 1/02*    (2006.01)
(52) U.S. Cl. ...................................... 342/125
(58) Field of Classification Search ................. 342/125, 342/458, 134
See application file for complete search history.

(56) References Cited

U.S. PATENT DOCUMENTS

| 4,370,653 | A  | * | 1/1983  | Crowley ...................... 342/125 |
| 5,453,748 | A  | * | 9/1995  | Lindell ......................... 342/51 |
| 6,674,396 | B2 | * | 1/2004  | Richards et al. ............. 342/125 |
| 7,570,199 | B2 | * | 8/2009  | Lee et al. ..................... 342/125 |
| 2004/0135719 | A1 | * | 7/2004 | Richards et al. ............. 342/125 |
| 2006/0214840 | A1 | * | 9/2006 | Kim et al. .................... 342/118 |
| 2008/0068255 | A1 | * | 3/2008 | Yang et al. .................. 342/134 |
| 2008/0106461 | A1 | * | 5/2008 | Lee et al. ..................... 342/134 |
| 2008/0162048 | A1 | * | 7/2008 | Yang et al. ..................... 702/2 |

* cited by examiner

*Primary Examiner*—Dan Pihulic
(74) *Attorney, Agent, or Firm*—Lowe Hauptman Ham & Berner

(57) ABSTRACT

A ranging apparatus includes a reference pulse generator generating a reference pulse having a first frequency at a first point in time of transmitting a ranging signal from a first device; a delay pulse generator generating a delay pulse signal having a second frequency at a second point in time of receiving the a response signal transmitted from the second device in response to the ranging signal; an overlap detector detecting a third point in time that the reference and delay pulses overlap each other; a counter counting one of the reference and delay pulses until the third point; and a distance calculator calculating an amount of time from the first point to the second point by applying the first and second frequencies, and a count value of the counter and calculating the distance between the first device and the second device by using the amount of time.

4 Claims, 4 Drawing Sheets

APPARATUS AND METHOD FOR ESTIMATING DISTANCE USING TIME OF ARRIVAL

CROSS-REFERENCE TO RELATED APPLICATIONS

This application claims the priority of Korean Patent Application No. 2006-0090309 filed on Sep. 18, 2006, in the Korean Intellectual Property Office, the disclosure of which is incorporated herein by reference.

BACKGROUND OF THE INVENTION

1. Field of the Invention

The present invention relates to an apparatus and method for estimating a distance by using time of arrival (TOA), and more particularly, to an apparatus and method for simply and quickly detecting a distance between wireless devices employed in a wireless location awareness system by detecting TOA using a single counter.

2. Description of the Related Art

In general, wireless location awareness systems employ methods of estimating a present location via wireless communication with other wireless communication devices using a wireless signal. Location information obtained by location awareness systems is importantly used when efficiently using information obtained by wireless communication via more efficient network construction.

To improve accuracy of location awareness in wireless location awareness systems, it is very important to accurately detect a distance between two wireless communication devices. Generally, to estimate a distance between two wireless communication devices, the distance is calculated by detecting time of arrival (TOA) that is an amount of time used in transmitting and receiving a signal in wireless communication between the two wireless communication devices. Also, pulses are count by using a counter and a count value of the pulses and frequencies of the pulses are used, thereby detecting the TOA.

FIGS. 1 and 2 are timing diagrams illustrating a conventional method of detecting TOA. Referring to FIGS. 1 and 2, there are shown pulses used to estimate a distance between a first wireless communication device (not shown) and a second wireless communication device (not shown) and count timing. Generally, the first wireless communication device transmits a ranging signal to the second wireless communication device, the second wireless communication device transmits a response signal to the first wireless communication device in response to the ranging signal, and the distance is detected by calculating an amount of time between a point in time of transmitting the ranging signal and a point in time of receiving the response signal.

The first wireless communication device transmits the ranging signal to the second wireless communication device at a time point t0 simultaneously with generating a reference pulse P0 with a predetermined frequency f0 and counts the reference pulses P0. The second wireless communication device receiving the ranging signal transmits the response signal responding to the ranging signal to the first wireless communication device. The first wireless communication device receives the response signal at a time point t1 simultaneously with generating a delay pulse P1 having a different frequency f1 from the frequency f0 of the reference pulse and counts the delay pulse P1. Also, the first wireless communication device detects and counts an overlap of the reference pulse P0 and the delay pulse P1. A time point t2 is a point in time that the reference pulse P0 and the delay pulse P1 start to overlap with each other, and a time point t3 is a point in time the overlap is finished.

In this case, there are generated three count values such as a count value N1 of the reference pulse P0, a count value N2 of the delay pulse P1, and an overlap count value N3. In general, as shown in Equation 1, a round-trip time Tx of the signal transmitted between the first wireless communication device and the second wireless communication device by using the three count values.

$$t' = \left(N1 + \frac{N3}{2}\right)/f0 = Tx + \left(N2 + \frac{N3}{2}\right)/f1 \quad \text{Equation 1}$$

$$Tx = \left(N1 + \frac{N3}{2}\right)/f0 - \left(N2 + \frac{N3}{2}\right)/f1$$

Where t' is a time point of a middle in a section where an overlap is detected.

The distance between the two wireless communication devices may be estimated by using a round-trip time calculated using Equation 1.

However, to apply conventional ranging methods, three counters for detecting three count values N1 to N3 are required, thereby increasing complexity of wireless communication devices.

Also, in conventional ranging method, it is required to detect sections where a reference pulse and a delay pulse overlap with each other. When pulses are a high frequency, it may be possible that an overlapped portion is not detected or a wrong portion is detected due to performance of a detector detecting an overlap or an internal glitch.

In addition, an amount of time for ranging is increased to detect overall sections where the reference pulse and the delay pulse overlap with each other.

SUMMARY OF THE INVENTION

An aspect of the present invention provides a ranging apparatus using time of arrival, the apparatus capable of reducing complexity of a system used for ranging by using a single counter, reducing an error caused by a malfunction of the system, and reducing an amount of time for ranging.

An aspect of the present invention also provides a ranging method using time of arrival.

According to an aspect of the present invention, there is provided a ranging apparatus for estimating a distance between a first wireless communication device and second wireless communication device wirelessly communicating with each other, the apparatus including: a reference pulse generator generating a reference pulse having a first frequency at a point in time of transmitting a ranging signal from the first wireless communication device to the second wireless communication device; a delay pulse generator generating a delay pulse signal having a second frequency different from the first frequency at a point in time of receiving the a response signal transmitted from the second communication device in response to the ranging signal, the first wireless communication device receiving the response signal; an overlap detector detecting a point in time that the reference pulse and the delay pulse overlap each other; a counter counting one of the reference pulse and the delay pulse until the point in time that the reference pulse and the delay pulse overlap each other; and a distance calculator calculating an amount of time from the point in time of transmitting the ranging signal to the point in time of receiving the response signal by applying the first frequency, the second frequency, and a count value of the counter and calculating the distance between the first wireless communication device and the second wireless communication device by using the amount of time.

The distance calculator may calculate the amount of time from the point in time of transmitting the ranging signal to the point in time of receiving the response signal by using Equation 2

$$Tx = N \cdot \left| \frac{1}{f0} - \frac{1}{f1} \right| + \delta \qquad \text{Equation 2}$$

where Tx indicates the amount of time from the point in time of transmitting the ranging signal to the point in time of receiving the response signal, N indicates one of a count value of the reference pulse and a count value of the delay pulse, f0 indicates a frequency of the reference pulse (the first frequency), f1 indicates a frequency of the delay pulse (the second frequency), and $\delta$ indicates an offset value.

According to another aspect of the present invention, there is provided a ranging method of estimating a distance between a first wireless communication device and a second wireless communication device wireless communicating with each other, the method including: transmitting a ranging signal from the first wireless communication device to the second wireless communication device simultaneously with generating a reference pulse having a first frequency; receiving a response signal transmitted from the second wireless communication device in response to the ranging signal, the first wireless communication device receiving the response signal, simultaneously with generating a delay pulse having a second frequency different from the first frequency; detecting a point in time that the reference pulse and the delay pulse overlap each other; counting one of the reference pulse and the delay pulse until the point in time that the reference pulse and the delay pulse overlap each other; and calculating an amount of time from the point in time of transmitting the ranging signal to the point in time of receiving the response signal by applying the first frequency, the second frequency, and a count value of the counter and calculating the distance between the first wireless communication device and the second wireless communication device by using the amount of time.

The calculating the distance may include calculating the amount of time from the point in time of transmitting the ranging signal to the point in time of receiving the response signal by using Equation 2.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Hereinafter, exemplary embodiments of the present invention will now be described in detail with reference to the accompanying drawings. However, there may be various changes in the embodiments of the present invention. The present invention will not be defined by the embodiments as follows. The embodiments are provided so that this disclosure will be thorough and complete, and will fully convey the concept of the invention to those skilled in the art. Also, terms defined in the description are defined by considering functions in the embodiments. These may vary with intentions or usages of those skilled in the art. Therefore, the terms should not be understood as meanings to define technical elements.

Figure 1:
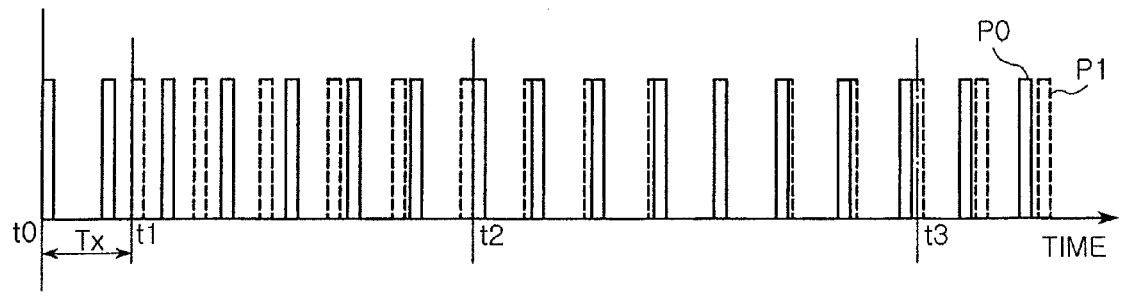
FIGS. 1 and 2 are timing diagrams illustrating a conventional ranging method using time of arrival (TOA)
Figure 2:
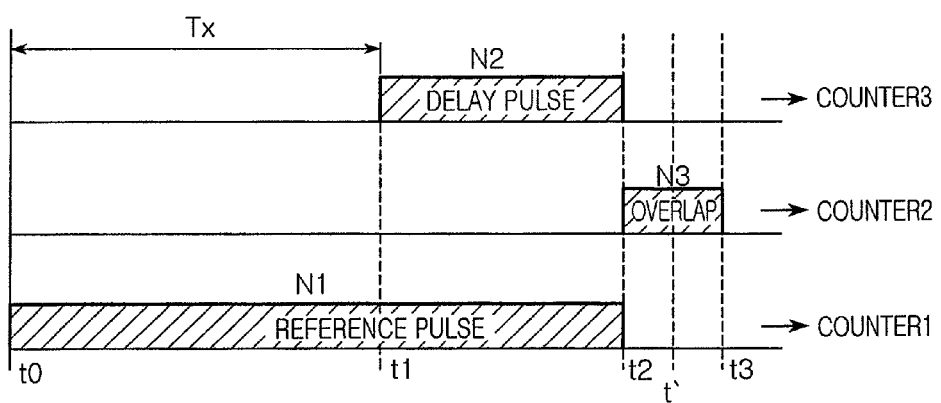
Figure 3:
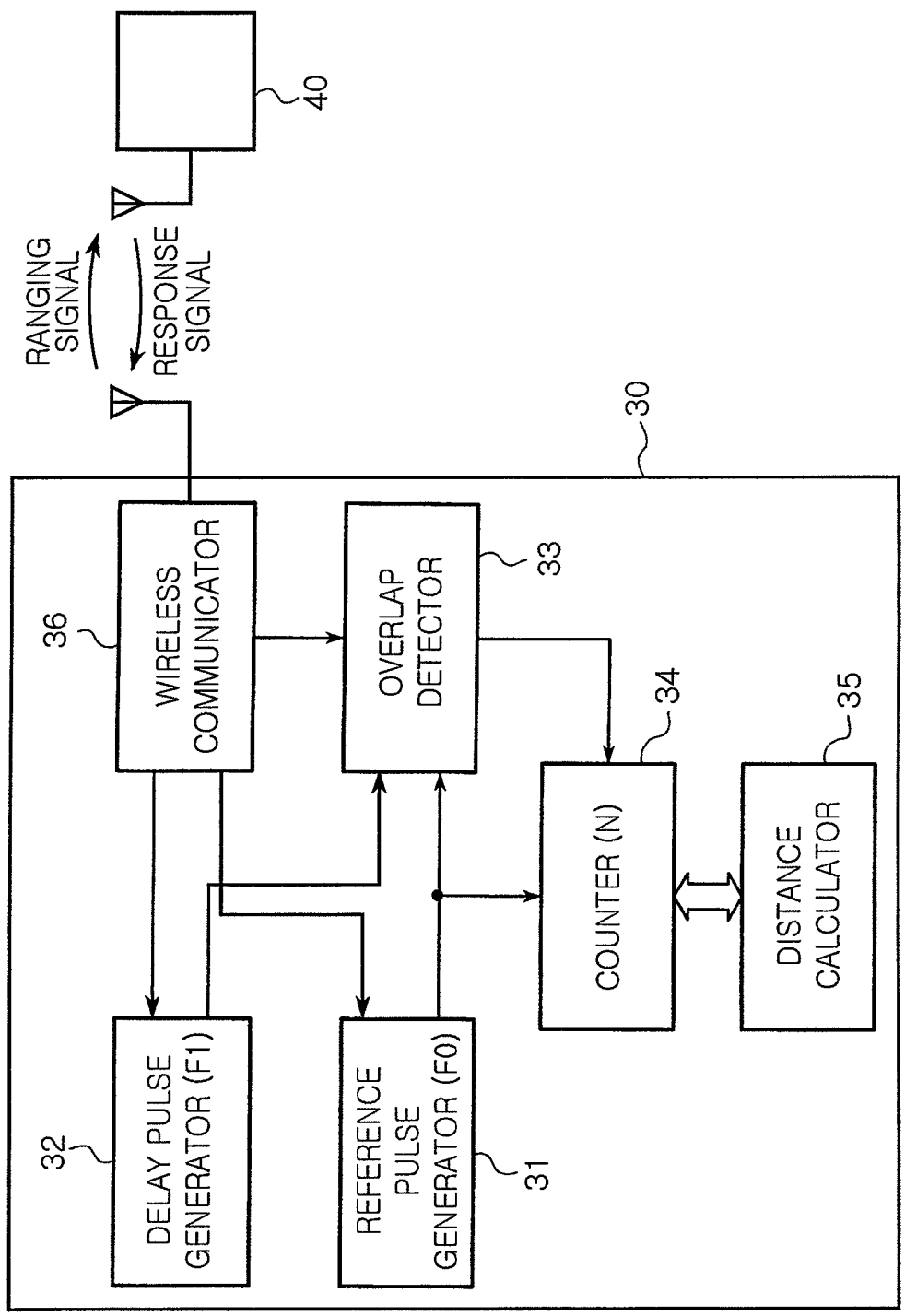
FIG. 3 is a block diagram illustrating a ranging apparatus using TOA according to an exemplary embodiment of the present invention.

FIG. 3 is a block diagram illustrating a ranging apparatus according to an exemplary embodiment of the present invention.

Referring to FIG. 3, the ranging apparatus includes a reference pulse generator 31, a delay pulse generator 32, an overlap detector 33, a counter 34, and a distance calculator 35. The ranging apparatus is applied to estimate a distance between a first wireless communication device and a second wireless communication device. The elements as described above may be included in one of the two wireless communication devices, for example, in the first wireless communication device 30. The wireless communication devices 30 and 40 may include a wireless communicator 36 for performing wireless communication therebetween.

The reference pulse generator 31 generates a reference pulse with a first frequency f0 at a point in time of transmitting a ranging signal from the first wireless communication device 30 to the second wireless communication device 40.

The delay pulse generator 32 generates a delay pulse with a second frequency f1 different from the first frequency f0 at a point in time that the first wireless communication device receives a response signal transmitted from the second wireless communication device in response to the ranging signal.

The overlap detector 33 detects a time point where the reference pulse and the delay pulse overlap with each other.

The counter 34 counts one of the reference pulse and the delay pulse until the time point of overlap and outputs a count value N.

The distance calculator 35 calculates an amount of time from the point in time of transmitting the ranging signal to the point in time of receiving the response signal by applying the first frequency of the reference pulse, the second frequency f1 of the delay pulse and the count value N of the counter 34. Also, the distance calculator 35 calculates a distance between the first wireless communication device and the second wireless communication device by using the calculated amount of time.

Figure 4:
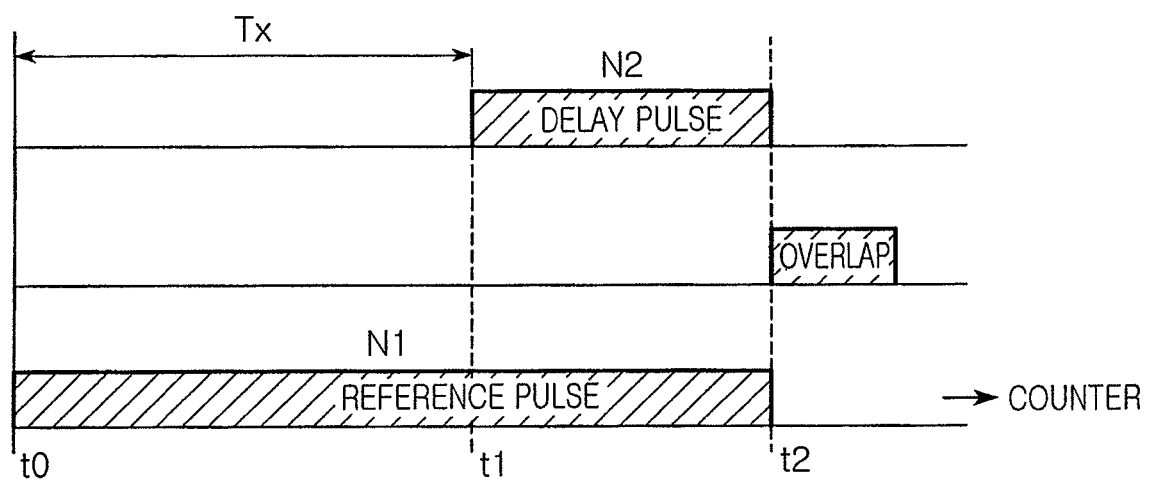
FIG. 4 is a timing diagram illustrating operations of the ranging apparatus using TOA according to an exemplary embodiment of the present invention.
Figure 5:
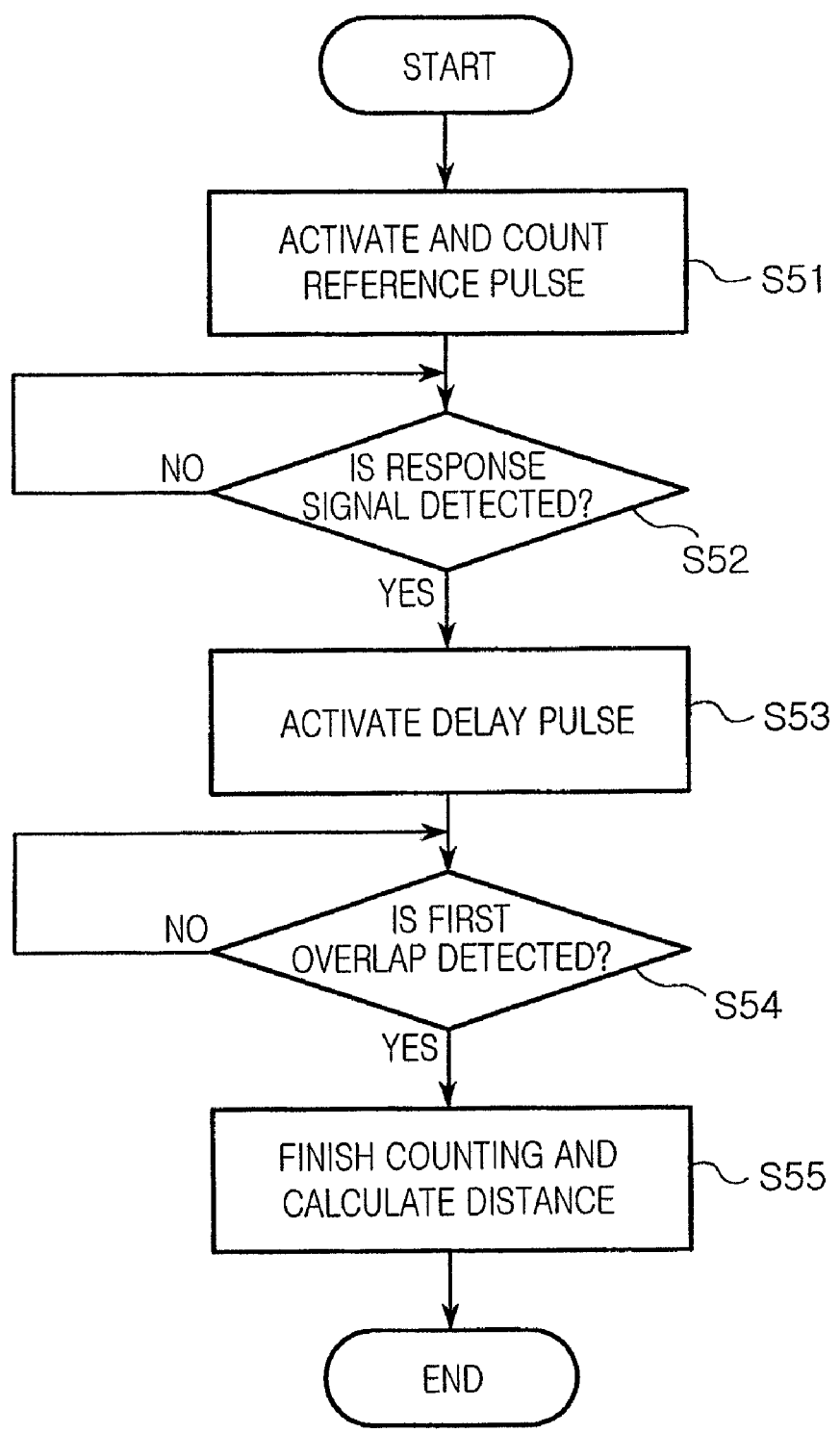
FIG. 5 is a flowchart illustrating a ranging method using TOA according to an exemplary embodiment of the present invention.

FIG. 4 is a timing diagram illustrating operations of the ranging apparatus using time of arrival (TOA) according to an exemplary embodiment of the present invention. FIG. 5 is a flowchart illustrating a ranging method using TOA according to an exemplary embodiment of the present invention.

Hereinafter, the operations of an embodiment of the present invention will be described in detail with reference to FIGS. 3 through 5. The ranging method according to an exemplary embodiment of the present invention will be more apparently understood by describing the operations.

When ranging begins, a reference pulse is activated and counted (S51). In this case, the wireless communicator 36 of the first wireless communication device 30 transmits a ranging signal to the second wireless communication device 40, while at the same time the reference pulse generator 31 generates the reference pulse with a predetermined first frequency. Also, the counter 34 starts counting the reference pulse. Transmitting the ranging signal, activating of the reference pulse, and beginning of counting are all performed at a time point t0.

In the present embodiment, the counter 34 counts the reference pulse. However, in another embodiment, the counter 34 may count a delay pulse with a second frequency that will be described later, which will be apparently described in operation S55 of calculating a distance.

The second wireless communication device 40 receives the ranging signal and transmits a response signal responding to the ranging signal to the first wireless communication device 30. When the response signal is detected at the first wireless communication device 30 (S52), the delay pulse generator 32 starts outputting a delay pulse at a time point t1 of detecting the response signal (S53). The delay pulse has a second frequency f1 different from the first frequency f0. According to an exemplary embodiment of the present invention, accuracy of ranging may be controlled by using a difference between the first frequency f0 and the second frequency f1. The smaller difference between the two frequencies, the more accurately estimating a distance. However, more accurate detection performance is required to more accurately estimating a distance. On the other hand, during the operation S53, the counter 34 continuously counts the reference pulse. As described above, according to another embodiment of the present invention, the delay pulse may be counted instead of the reference pulse. Accordingly, in another embodiment, in the operation S53, the counter 34 may start counting the delay pulse simultaneously with beginning of the delay pulse.

When the overlap detector 33 detects a section where the reference pulse and the delay pulse overlap with each other (S54), the counter 34 finishes counting the reference pulse and transmits a count value from the time point t0 of transmitting the ranging signal to a time point t2 of detecting the overlap of the reference pulse and the delay pulse to the distance calculator 35 and the distance calculator 35 calculates a distance between the first wireless communication device 30 and the second wireless communication device 40 by using the count value N (S55).

Calculating the distance between the first wireless communication device 30 and the second wireless communication device 40 by the distance calculator 35 will be described in detail with reference to FIG. 4.

As described above, a point in time that the ranging signal is transmitted from the first wireless communication device 30 is defined as a time point t0, a point in time that a response signal responding to the ranging signal is received from the second wireless communication device 40 to the first wireless communication device 30 is defined as a time point t1, and a point in time that an overlap between the reference pulse and the delay pulse is detected is defined as t2. Also, an amount of time from the time point t0 of transmitting the ranging signal to the time point t1 of receiving the response signal is defined as Tx, a count value of counting the reference pulse until the time point t2 of detecting the overlap is defined as a count value N1, and a count value of counting the delay pulse until the time point t2 of detecting the overlap is defined as a count value N2. In the present invention, only one of the reference pulse and the delay pulse is counted. Therefore, the count values N1 and N2 are not values of actually counting but values defined for description.

The time point t2 of detecting the overlap may be calculated by using the count value N1 of the reference pulse and the count value N2 of the delay pulse as shown in Equation 3.

$$t2 = \frac{N1}{f0} = Tx + \frac{N2}{f1} \qquad \text{Equation 3}$$

where f0 is a first frequency of the reference pulse, and f1 is a second frequency of the delay pulse.

As shown in Equations 3 and 4, the amount of time Tx from the time point t0 of transmitting the ranging signal to the time point t1 of receiving the response signal may be obtained. The Tx is a round-trip time between the two wireless communication devices 30 and 40. Therefore, the distance between the two wireless communication devices 30 and 40 may be calculated by determining the amount of time Tx.

$$Tx = \frac{N1}{f0} - \frac{N2}{f1} \qquad \text{Equation 4}$$

On the other hand, when ranging is performed within a distance with a fully smaller value of Tx than one of a period 1/f0 of the reference pulse and a period 1/f1 of the delay pulse, for example, in an indoor environment within a radius less than 30 m, the count value N1 of the reference pulse and the count value N2 of the delay pulse have an approximately identical value to each other. Therefore, Equation 4 may be approximated as Equation 2.

$$Tx = N \cdot \left| \frac{1}{f0} - \frac{1}{f1} \right| + \delta \qquad \text{Equation 2}$$

where N is a count value of one of the reference pulse and the delay pulse.

An offset value δ capable of being randomly determined in Equation 2 includes all errors capable of being included during a process of applying the present invention. For example, the offset value δ may include an error that may occur when approximating the count value N1 of the reference pulse to the count value N2 of the delay pulse in a process of drawing Equation 2. Also, an error caused by an amount of time for processing a signal at the second wireless communication device during a process of receiving a ranging signal transmitted from the first wireless communication device and transmitting a response signal responding to the ranging signal may be included.

As described above, according to an exemplary embodiment of the present invention, since a counter is operated only until a time point of an overlap between a reference pulse and a delay pulse begins (from t0 to t2), an amount of time for ranging may be reduced rather than conventional ranging methods of counting overall sections where an overlap is performed (from t0 to t3).

Also, as shown in Equation 2, since a distance may be detected using only one count value, the number of counters is reduced rather than conventional ranging technologies, thereby reducing complexity of a system.

As described above, according to an exemplary embodiment of the present invention, since a distance may be detected by using a count value obtained by a single counter, complexity of a system may be reduced rather than conventional technologies using a plurality of counters. In addition, a probability of generating an error in ranging, the error caused by a malfunction of a counter, is lower than that of a case of using a plurality of counters.

Also, according to an exemplary embodiment of the present invention, since a counter is operated until a time point where an overlap between a reference pulse and a delay pulse begins, an amount of time for ranging may be reduced rather than conventional ranging methods of counting overall sections where an overlap is performed.

While the present invention has been shown and described in connection with the exemplary embodiments, it will be apparent to those skilled in the art that modifications and variations can be made without departing from the spirit and scope of the invention as defined by the appended claims.

What is claimed is:

1. A ranging apparatus for estimating a distance between a first wireless communication device and second wireless communication device wirelessly communicating with each other, the apparatus comprising:
    a reference pulse generator generating a reference pulse having a first frequency at a point in time of transmitting a ranging signal from the first wireless communication device to the second wireless communication device;
    a delay pulse generator generating a delay pulse signal having a second frequency different from the first frequency at a point in time of receiving a response signal transmitted from the second communication device in response to the ranging signal, the first wireless communication device receiving the response signal;
    an overlap detector detecting a point in time that the reference pulse and the delay pulse overlap each other;
    a counter counting one of the reference pulse and the delay pulse until the point in time that the reference pulse and the delay pulse overlap each other; and
    a distance calculator calculating an amount of time from the point in time of transmitting the ranging signal to the point in time of receiving the response signal by applying the first frequency, the second frequency, and a count value of the counter and calculating the distance between the first wireless communication device and the second wireless communication device by using the amount of time.

2. The apparatus of claim 1, wherein the distance calculator calculates the amount of time from the point in time of transmitting the ranging signal to the point in time of receiving the response signal by using Equation 2

$$Tx = N \cdot \left| \frac{1}{f0} - \frac{1}{f1} \right| + \delta \qquad \text{Equation 2}$$

where Tx indicates the amount of time from the point in time of transmitting the ranging signal to the point in time of receiving the response signal, N indicates one of a count value of the reference pulse and a count value of the delay pulse, f0 indicates a frequency of the reference pulse, f1 indicates a frequency of the delay pulse, and δ indicates an offset value.

3. A ranging method of estimating a distance between a first wireless communication device and a second wireless communication device wireless communicating with each other, the method comprising:
    generating a reference pulse having a first frequency simultaneously with transmitting a ranging signal from the first wireless communication device to the second wireless communication device;
    generating a delay pulse having a second frequency different from the first frequency simultaneously with receiving a response signal transmitted from the second wireless communication device in response to the ranging signal, the first wireless communication device receiving the response signal;
    detecting a point in time that the reference pulse and the delay pulse overlap each other;
    counting one of the reference pulse and the delay pulse until the point in time that the reference pulse and the delay pulse overlap each other; and
    calculating an amount of time from the point in time of transmitting the ranging signal to the point in time of receiving the response signal by applying the first frequency, the second frequency, and a count value of the counter and calculating the distance between the first wireless communication device and the second wireless communication device by using the amount of time.

4. The apparatus of claim 3, wherein the calculating the distance comprises calculating the amount of time from the point in time of transmitting the ranging signal to the point in time of receiving the response signal by using Equation 2

$$Tx = N \cdot \left| \frac{1}{f0} - \frac{1}{f1} \right| + \delta \qquad \text{Equation 2}$$

where Tx indicates the amount of time from the point in time of transmitting the ranging signal to the point in time of receiving the response signal, N indicates one of a count value of the reference pulse and a count value of the delay pulse, f0 indicates a frequency of the reference pulse, f1 indicates a frequency of the delay pulse, and δ indicates an offset value.

* * * * *